United States Patent
Leung et al.

(10) Patent No.: US 6,462,966 B1
(45) Date of Patent: Oct. 8, 2002

(54) POWER SUPPLY CIRCUIT AND METHOD

(75) Inventors: Tak Ming Leung, Hung Hom (HK); Yim Shu Lee, Shatin (HK); Hoi Lam Martin Chow, TST East (HK); Tze Kau Man, Tuen Mun (HK); Guy Fung Kai Cheung, Ma On Shan (HK); Ka-Lon Chu, Shatin (HK)

(73) Assignee: Semiconductor Components Industries LLC, Phoenix, AZ (US)

( * ) Notice: Subject to any disclaimer, the term of this patent is extended or adjusted under 35 U.S.C. 154(b) by 0 days.

(21) Appl. No.: 09/834,132

(22) Filed: Apr. 13, 2001

(51) Int. Cl.[7] .......................... H02M 3/335; H02M 7/44
(52) U.S. Cl. ..................... 363/25; 363/133; 363/97
(58) Field of Search ...................... 363/24, 25, 26, 363/124, 133, 134, 97; 323/266

(56) References Cited

U.S. PATENT DOCUMENTS

| | | | |
|---|---|---|---|
| 4,729,088 A | * | 3/1988 | Wong .......................... 363/124 |
| 5,317,496 A | * | 5/1994 | Seirsen ........................ 363/24 |
| 5,327,337 A | * | 7/1994 | Cripe .......................... 363/134 |
| 5,510,974 A | * | 4/1996 | Gu et al. ..................... 363/134 |

* cited by examiner

Primary Examiner—Bao Q. Vu
(74) Attorney, Agent, or Firm—James J. Stipanuk

(57) ABSTRACT

A power supply (10) has a first transistor (20) coupled for switching a coil current ($I_{I9}$) in response to a first control signal ($V_{C1}$). A second transistor (30) has a body diode (32) for discharging the coil current to produce a power factor corrected signal ($V_{PFC}$). A conduction channel (31) of the second transistor is responsive to a second control signal ($V_{C3}$) for developing a second coil current ($I_{61}$) from the power factor corrected signal to adjust an output signal of the power supply, where the second control signal commences a time interval (TD2) after the first control signal terminates.

18 Claims, 4 Drawing Sheets

POWER SUPPLY CIRCUIT AND METHOD

BACKGROUND OF THE INVENTION

The present invention relates in general to semiconductor devices and, more particularly, to high efficiency, high voltage boost regulators.

Electric utility companies are requiring electrical equipment manufacturers to increase efficiency by controlling the manner in which the equipment loads the alternating current (AC) voltage signal provided at the power mains. For example, in some regions, systems that consume at least fifty watts of power are required to utilize power factor correction (PFC) circuitry to ensure that current is drawn over an entire cycle of the AC voltage signal rather than only at the voltage peaks. PFC circuits essentially control the relationship between the input voltage and the current load of a system to distribute the current load evenly throughout a cycle. In effect, PFC circuits maintain an in-phase relationship between the system's load current and the AC mains voltage.

However, existing PFC circuits suffer from a high component count, which results in both a high system cost and a large physical size needed for housing the PFC circuits.

Hence, there is a need for a power supply that includes PFC circuitry with fewer components to reduce the cost and size of the power supply.

DETAILED DESCRIPTION OF THE DRAWINGS

In the figures, elements having the same reference numbers have similar functionality.

Figure 1:
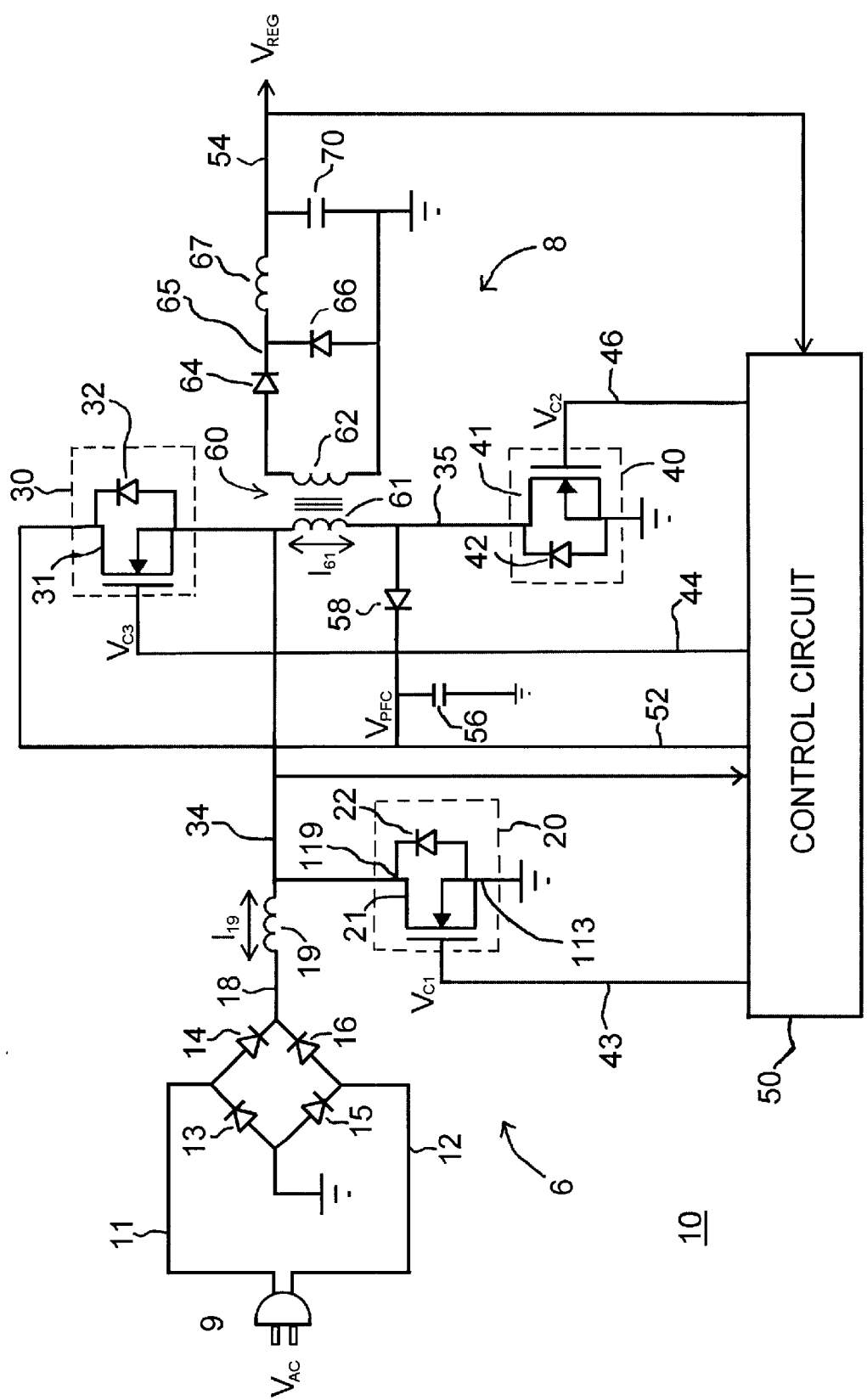
FIG. 1 is a schematic diagram of a power supply.

FIG. 1 is a schematic diagram of a power supply 10 including a power factor correction stage 6 and a regulation stage 8. Power supply 10 has inputs coupled through a plug 9 to electrical mains 11 and 12 for receiving an alternating current (AC) input voltage VAC operating at two hundred twenty volts root-mean-square and a frequency of fifty hertz. $V_{AC}$ is rectified by diodes 13–16 operating as a standard full wave bridge rectifier that produces positive going portions of voltage $V_{AC}$ with a peak value of about three hundred ten volts on a node 18. Power supply 10 has an output coupled to a node 54 for producing a regulated direct current (DC) output voltage $V_{REG}$=5.0 volts.

Power factor correction stage 6 includes a coil or inductor 19, a transistor 21 of a transistor structure 20, a body diode 32 of a transistor structure 30 and a capacitor 56. Regulation stage 8 includes a body diode 22 of transistor structure 20, a transistor 31 of transistor structure 30, a transistor structure 40, a diode 58 and a transformer 60. Inductor 19 has an inductance $L_{19}$=220.0 microhenries and capacitor 56 has a capacitance $C_{56}$=200.0 microfarads. Diode 58 operates as a rectifier having a reverse bias breakdown voltage of at least six hundred volts.

Transformer 60 includes a primary winding 61 and a secondary winding 62 having a turns ratio of about 30:1 to operate as a step down transformer. Diode 64 functions as a rectifier that is forward biased when transistors 31 and 41 are turned on to produce a coil current $I_{61}$ through primary winding 61. A positive current in secondary winding 62 flows with an increasing magnitude through diode 64 and an inductor 67 to node 54. A capacitor 70 functions as a filtering element to reduce the voltage ripple of output voltage $V_{REG}$. When transistors 31 and 41 are turned off, diode 64 reverse biases. Current flows through inductor 67 with a decreasing magnitude and is routed through diode 66 to node 54 for filtering by capacitor 70. In one embodiment, inductor 67 has an inductance $L_{67}$=330.0 microhenries and capacitor 70 has a capacitance $C_{70}$=47.0 microfarads.

Control circuit 50 comprises an integrated circuit that controls the power factor correction of power supply 10 as well as the regulation of output voltage $V_{REG}$ as described below. Control circuit 50 has an input coupled to a node 52 for sensing a power factor correction voltage $V_{PFC}$ developed across capacitor 56 and an input coupled to node 54 for sensing the value of $V_{REG}$. Outputs coupled to nodes 43, 46 and 44 produce control signals $V_{C1}$, $V_{C2}$ and $V_{C3}$ for switching transistors 21, 31 and 41, respectively. Control signals $V_{C1}$, $V_{C2}$ and $V_{C3}$ are pulsewidth modulated digital signals. $V_{C1}$ and $VC_2$ have a logic low value of about zero volts and a logic high value of about five volts. $V_{C3}$ is referenced to the current voltage on a node 34, and is level shifted to have a logic low value approximately equal to the voltage on node 34 and a logic high value approximately five volts above the current voltage on node 34. A first feedback path FB1 senses voltage $V_{PFC}$ to set the pulsewidth of control signal $V_{C1}$ to maintain $V_{PFC}$ at about five hundred fifty volts. A second feedback path FB2 senses voltage $V_{REG}$ to set the pulsewidths of control signals $V_{C2}$ and $V_{C3}$ to maintain $V_{REG}$ at a value of about five volts.

Transistor structures 20, 30 and 40 are standard power devices implemented as standard n-channel metal-oxide-semiconductor field-effect transistors (MOSFET). Transistor structure 20 is shown as a composite device having first and second current paths designated as transistor 21 and a body diode 22, respectively. Similarly, transistor structures 30 and 40 are composite devices that include transistors 31 and 41 and body diodes 32 and 42, respectively. Transistors 21, 31 and 41 have a gate to source conduction threshold voltage of about two volts and a switchable source to drain conduction channel that can provide at least one ampere of current flow. Transistors 21, 31 and 41 have a drain to source breakdown voltage of at least six hundred volts.

Figure 2:
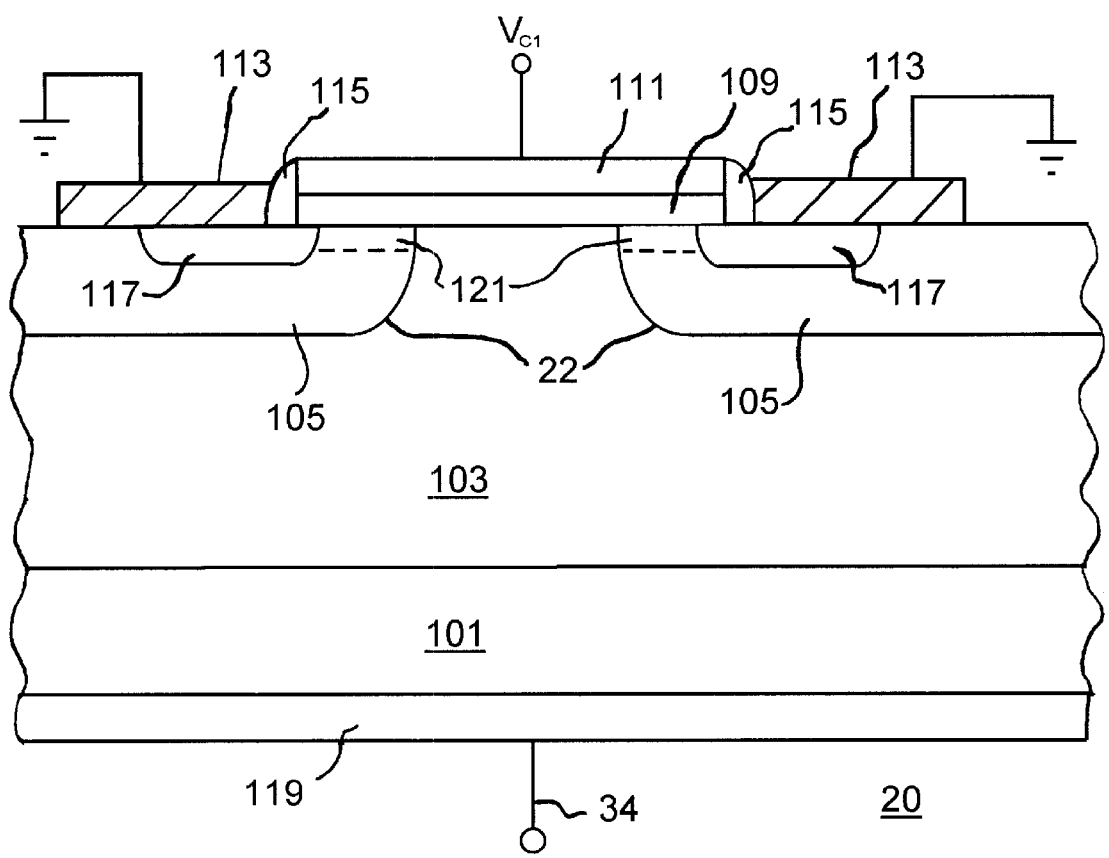
FIG. 2 is a cross-sectional view of a power transistor of the power supply.

FIG. 2 shows a cross-sectional view of transistor structure 20 as formed on a semiconductor substrate 101. Transistor structures 30 and 40 are similarly configured. Transistor structure 20 includes transistor 21 having an electrode 113 operating as a source, a gate electrode 111 and an electrode 119 operating as a drain. Transistor structure 20 further includes body diode 22 formed at the junction of an epitaxial layer 103 operating as a cathode coupled to electrode 119 and body region 105 operating as an anode coupled to electrode 113. Multiple regions 105 are coupled together out of the view plane of FIG. 2 to function as body region 105 of transistor structure 20. Similarly, multiple electrodes 113 are coupled together out of the view plane to function as a single electrode 113.

Substrate 101 comprises a low resistivity n-type material to provide a low on resistance. Electrode 119 is formed with aluminum or another metal or highly conductive material adjacent to substrate 101 for coupling to node 34 of power supply 10.

Epitaxial layer 103 is formed over substrate 101 with an n-type material to have a higher resistivity than substrate 101. Body region 105 is formed with p-type material having a high resistivity to allow an inversion layer or conduction channel 121 to be formed in response to control signal $V_{C1}$.

Source region 117 is formed within body region 105 as an n-type semiconductor material doped to have a low resistivity to provide a low on resistance and ohmic contact to electrode 113. Note that body region 105 and source region 117 are coupled together with electrode 113 for biasing at the same potential. In a typical embodiment of power supply 10, electrode 113 of transistor structure 20 is biased to ground potential.

A gate dielectric 109 is formed to overlie portions of body region 105 as shown and a gate electrode 111 is formed over gate dielectric 109 with heavily doped polysilicon or another conductive material to receive control signal $V_{C1}$. Spacers 115 are formed adjacent to gate electrode 111 to provide electrical isolation between gate electrode 111 and electrodes 113.

The operation of the first and second current paths of transistor structure 20 is described as follows. The first current path through transistor 21 is enabled when control signal $V_{C1}$ has a positive voltage greater than the gate to source conduction threshold of transistor 21 while electrode 119 is biased at a positive potential. An inversion layer or channel 121 is formed within body region 105 that enables a current flow from electrode 113 through source region 117, channel 121, epitaxial layer 103, and substrate 101 to electrode 119. With these biasing conditions, body diode 22 is reversed biased and therefore has no current flow. The second current path through body diode 22 is enabled by setting control signal $V_{C1}$ to zero volts and biasing electrode 119 to a negative potential with respect to body region 105. Body diode 22 forward biases to allow a current flow from electrode 119 through substrate 101, epitaxial layer 103 and body region 105 to electrode 113. Since no channel is formed, transistor 21 is off.

Figure 3:
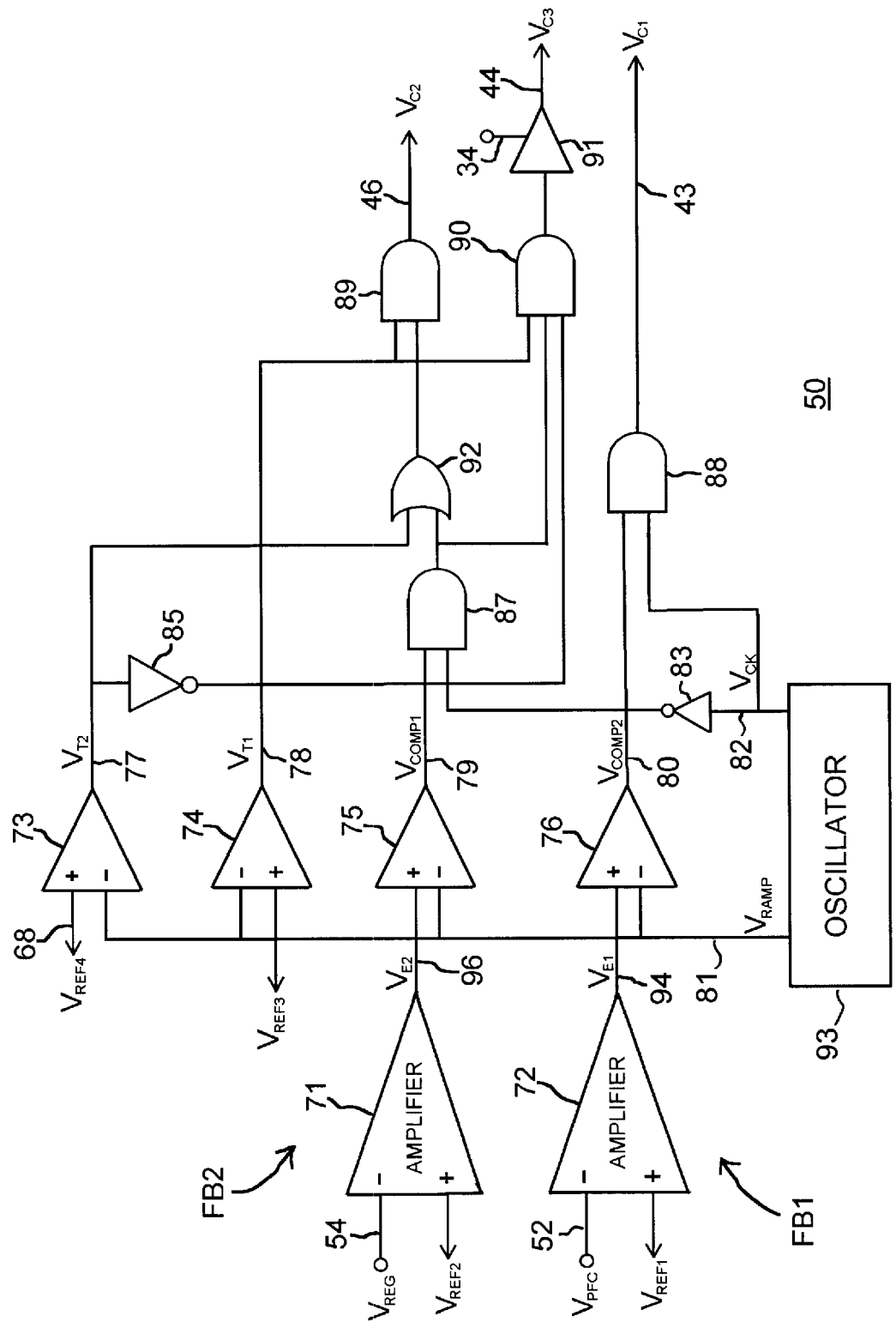
FIG. 3 is a schematic diagram of a power supply control circuit.

FIG. 3 shows a schematic diagram of control circuit 50 in further detail, including amplifiers 71 and 72, comparators 73–76 and an oscillator 93. Control circuit 50 further includes standard logic components comprising inverters 83 and 85, logic AND gates 87–90, a logic OR gate 92 and a level shifter 91. As previously described, control circuit 50 has inputs coupled to nodes 52 and 54 to monitor voltages $V_{PFC}$ and $V_{REG}$, respectively, and outputs coupled to nodes 43, 46 and 44 for providing control signals $V_{C1}$, $V_{C2}$ and $V_{c3}$, respectively.

Oscillator 93 has an output coupled to a node 82 for producing a square wave output signal $V_{CK}$ and an output coupled to a node 81 for producing a triangle wave output signal $V_{RAMP}$. Output signals $V_{CK}$ and $V_{RAMP}$ have amplitudes that swing between zero and five volts at a frequency of one hundred kilohertz, or a period of ten microseconds.

First feedback path FB1 for regulating voltage $V_{PFC}$ comprises amplifier 72, comparator 76 and AND gate 88. An input of first feedback path FB1 is coupled to node 52 for sensing the amplitude of voltage $V_{PFC}$. An output is coupled to node 43 for producing pulses of control signal $V_{C1}$ which are representative of the voltage difference between the current level of $V_{PFC}$ and its regulated value of five hundred fifty volts.

Amplifier 72 is configured as a differential sense amplifier which includes a voltage divider for internally reducing voltage $V_{PFC}$ to a lower voltage to facilitate signal processing. The difference between the lower voltage and a reference voltage $V_{REF1}$ functions as an error signal $V_{E1}$ which is provided at an output coupled to a node 94. Comparator 76 compares $V_{E1}$ with $V_{RAMP}$ and produces a digital output signal $V_{COMP2}$ on a node 80 which has a value of logic high when $V_{RAMP}$ is less than $V_{E1}$ and logic low when $V_{RAMP}$ is greater than $V_{E1}$.

Second feedback path FB2 for regulating voltage $V_{REG}$ includes amplifier 71, comparator 75 and AND gate 87. A first branch of the second feedback path includes OR gate 92 and AND gate 89 for providing pulses of control signal $V_{C2}$ at node 46. A second branch of feedback path FB2 includes three input AND gate 90 and level shifter 91 for providing pulses of control signal $V_{C3}$ at node 44. An input of second feedback path FB2 is coupled to node 54 for sensing the amplitude of voltage $V_{REG}$ and an output produces pulses of control signals $V_{C2}$ and $V_{C3}$ at nodes 46 and 44, respectively, which are representative of the difference between the current level of voltage $V_{REG}$ and its regulated value of five volts.

Amplifier 71 functions as a differential sense amplifier which includes a voltage divider for internally reducing voltage $V_{REG}$ to a lower voltage to facilitate signal processing. The difference between the lower voltage and a reference voltage $V_{REF2}$ is provided as an error signal $V_{E2}$ at an output coupled to a node 96. Comparator 75 compares $V_{E2}$ with $V_{RAMP}$ and produces a digital output signal $V_{COMP1}$ on a node 79 which is has a value of logic high when $V_{RAMP}$ is less than $V_{E2}$ and logic low when $V_{RAMP}$ is greater than $V_{E2}$.

Level shifter 91 has a reference input for receiving the potential on node 34 for effectively establishing a logic reference for driving the gate of transistor 31. A logic input receives an input logic signal from AND gate 90 that swings between zero and five volts. An output is coupled to node 44 to level shift the input logic signal to produce control signal $V_{C3}$ to have a logic low value approximately equal to the voltage on node 34 and a logic high value approximately five volts greater than the voltage on node 34.

Comparator 73 operates with oscillator 93 to function as a first time shifting circuit. Comparator 73 has a first input coupled to node 81 for receiving $V_{RAMP}$ and a second input coupled to a node 68 for receiving a reference signal $V_{REF4}$ to produce a digital comparison signal $V_{T2}$ at a node 77. A leading edge of comparison signal $V_{T2}$ occurs at a time interval TD1 before a trailing edge of $V_{CK}$ and a trailing edge of $V_{T2}$ occurs a time interval TD2 after a trailing edge of $V_{CK}$. Time intervals TD1 and TD2 allow transistors 41 and 31 to operate with soft switching as described below. In one embodiment, time intervals TD1 and TD2 are one hundred fifty nanoseconds each.

Comparator 74 operates with oscillator 93 to function as a second time shifting circuit that compares $V_{RAMP}$ to a reference signal $V_{REF3}$ to produce a digital comparison signal $V_{T1}$ at a node 78. A trailing edge of comparison signal $V_{T1}$ occurs at a time interval TD3 before a leading edge of $V_{CK}$ and a leading edge of $V_{T1}$ occurs a time interval TD4 after a leading edge of $V_{CK}$. Time intervals TD3 and TD4 are selected to ensure that control signals $V_{C2}$ and $V_{C3}$ operate with less than a fifty percent duty cycle so that the energy stored in primary winding 61 is fully discharged. In one embodiment, time intervals TD3 and TD4 are one hundred fifty nanoseconds each.

Figure 4:
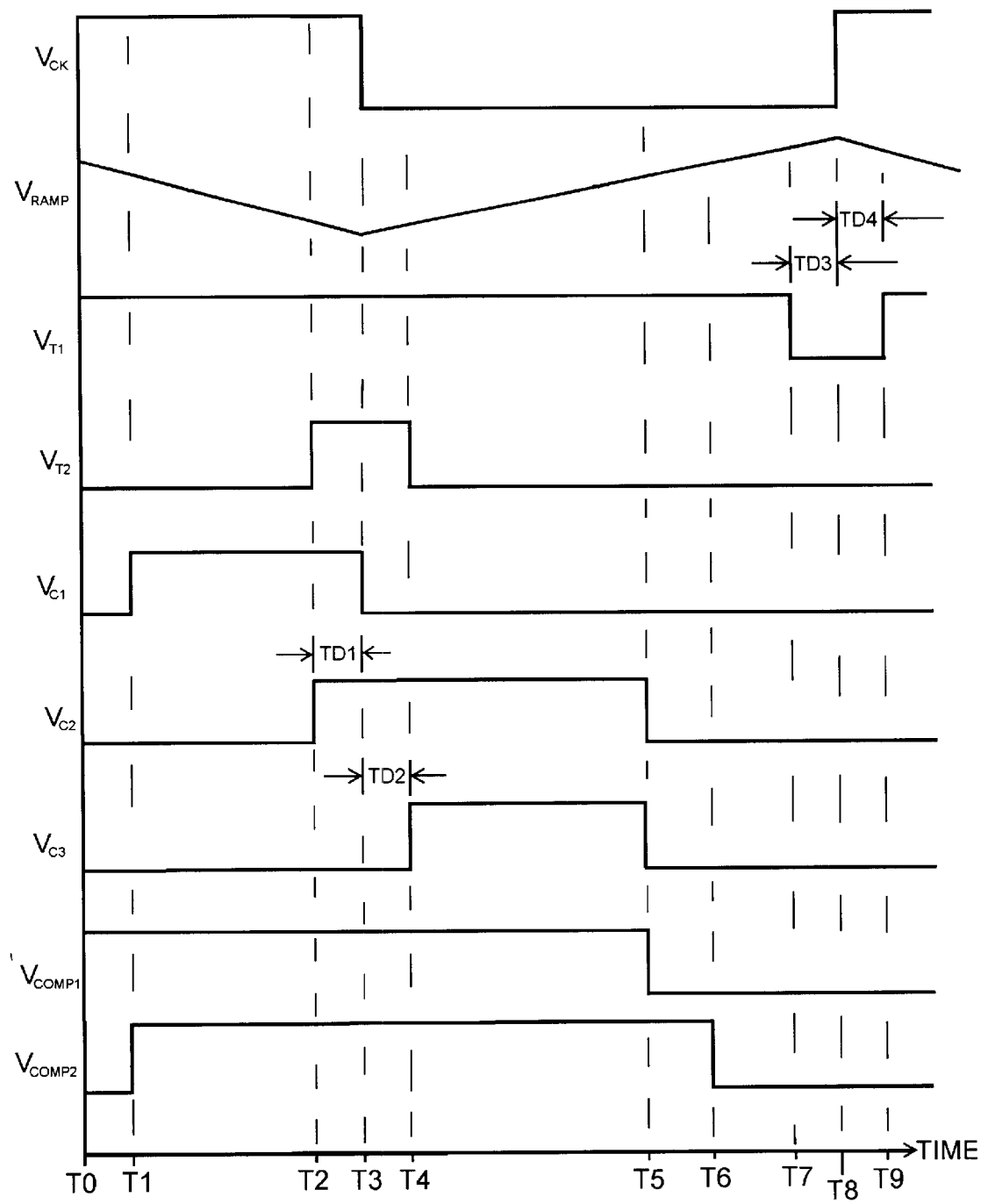
FIG. 4 is a timing diagram showing waveforms of the power supply.

A typical cycle of the operation of power supply 10 can be seen be referring to waveforms shown in the timing diagram of FIG. 4. The specific times described below are exemplary, and may vary depending on the degree to which the voltage levels of $V_{PFC}$ and $V_{REG}$ have decayed since the previous cycle.

Initially, at time T0=0.0 seconds, control signals $V_{C1}$, $V_{C2}$ and $V_{C3}$ are low and transistor structures 20, 30 and 40 are turned off. $V_{RAMP}$ is initially lower than $V_{REF3}$ and higher than $V_{REF4}$, $V_{T1}$ is logic high and $V_{T2}$ is logic low. Assume that $V_{PFC}$ and $V_{REG}$ are lower than their respective regulated values, so that comparison signal $V_{COMP1}$ is logic high while $V_{COMP2}$ is logic low.

At time T1=1.0 microseconds, $V_{RAMP}$ decreases to a level less than $V_{E1}$, setting $V_{COMP2}$ high to initiate a pulse of control signal $V_{C1}$. Transistor 21 turns on to switch node 34 to about ground potential and supply coil current $I_{19}$ to store magnetic energy in inductor 19. Transistors 31 and 41 are turned off, so no current flows through secondary winding 62. During this period, magnetic energy stored in primary winding 61 during the previous cycle is discharged through diode 58, body diode 22 of transistor structure 20, and capacitor 56. The time to fully discharge this magnetic energy is approximately equal to the length of time transistors 31 and 41 were turned on during the previous cycle. Since TD3 is selected so that current $I_{61}$ flows with less than a fifty percent duty cycle, the magnetic energy is fully discharged before the end of this period.

At time T2=3.85 microseconds, the magnetic energy in primary winding 61 is discharged, which effectively sets a node 35 to about ground potential. Comparator 73 sets $V_{T2}$ to a logic high value to generate a low to high transition of control signal $V_{C2}$ and turn on transistor 41. However, transistor 31 remains turned off so no current flows through primary winding 61 or transistor 41. Hence, at time T2, transistor turns on while its drain to source potential is zero. The condition of turning on transistor 41 with no current flow and a drain to source voltage of zero is referred to as soft switching. Soft switching provides an advantage of virtually eliminating the power lost through switching transients of transistor 41, thereby substantially reducing the power dissipated by power supply 10.

At time T3=4.0 microseconds, clock signal $V_{CK}$ undergoes a high to low transition to reset control signal $V_{C1}$ to zero volts and turn off transistor 21. Node 34 rises in potential above node 52 to turn on body diode 32 and transfer the magnetic energy stored in inductor 19 to capacitor 56, thereby increasing the voltage of node 52. Because $V_{RAMP}$ varies linearly with time, the width of the $V_{C1}$ pulse is effectively proportional to $V_{E2}$, or the difference between the desired value of $V_{PFC}$ and its current value. Time T3 is set to occur at constant time interval TD1=150.0 nanoseconds, approximately, after time T2.

At time T4=4.15 microseconds, comparison signal $V_{T2}$ is reset to low, which causes control signal $V_{C3}$ to make a low to high transition that turns on transistor 31. The drain to source potential of transistor 31 is approximately zero as a result of turning on body diode 32. Hence, transistor 31 operates in a soft switching mode, which further reduces the power loss due to a switching transient of transistor 31. Since transistor 41 was turned on at time T2, current flows from transistor 31 through primary winding 61 and transistor 41 to ground potential. The change in the current flowing through primary winding 61 induces a positive current in secondary winding 62 which flows through diode 64 and inductor 67 to charge capacitor 70. Time T4 occurs time interval TD2=150.0 nanoseconds, approximately, after time T3 to allow the voltage on node 34 to rise to approximately the level of the node 52 voltage.

At time T5=7.0 microseconds, as $V_{RAMP}$ increases to a level greater than $V_{E2}$, $V_{COMP1}$ is reset to low to terminate the $V_{C2}$ and $V_{C3}$ pulses and turn off transistors 31 and 41. Node 34 swings low and node 35 swings high to discharge the current energy stored in primary winding 61 through body diode 22, diode 58 and capacitor 56. When transistors 31 and 41 are off, no current flows through secondary winding 62. During this interval, the current energy stored in inductor 67 is discharged through diode 66 and capacitor 70 to regulate the level of $V_{REG}$.

At time T6=7.5 microseconds, $V_{RAMP}$ increases to a level higher than the level of error signal $V_{E1}$ to reset comparison signal $V_{COMP2}$ to a logic low.

At time T7=8.85 microseconds, $V_{RAMP}$ further increases to a level higher than the level of reference signal $V_{REF3}$, setting $V_{T1}$ low to force any pulses of control signals $VC_2$ and $V_{C3}$ to terminate if they have not previously done so. Such a forced termination ensures that transistors 31 and 41 operate with less than a fifty percent duty cycle to fully discharge the magnetic energy stored in primary winding 61.

At time T8=9.0 microseconds, clock signal $V_{CK}$ switches high and $V_{RAMP}$ reaches its maximum value. At time T9=9.15 microseconds, as $V_{RAMP}$ decreases to a level lower than the level of reference signal $V_{REF3}$, $V_{T1}$ is set to a logic high to end the cycle.

In summary, the above described power supply includes a power factor correction stage and a regulator stage that operate with a higher efficiency and a lower cost than previous power supplies. A first transistor is coupled to a first node for switching a first coil current with a first control signal. A second transistor has a body diode for discharging the first coil current to a second node to produce a power factor corrected signal. A third transistor operates in response to a second control signal that commences a time interval before the first control signal terminates for maintaining a constant potential on the first node. A conduction path of the second transistor is enabled with a third control signal for routing a second coil current from the second node to the third transistor to adjust an output signal of the power supply, where the third control signal commences a time interval after the first control signal terminates. The timing of the first and second control signals allows the second transistor to operate in a soft switching mode when its drain to source potential is at or near zero volts. Similarly, the timing of the first and third control signals allows the third transistor to operate in a soft switching mode. The use of body diodes to discharge coil currents reduces the number of power supply components in comparison to previous power factor corrected power supplies, thereby reducing both the cost and size of the power supply. Moreover, the body diodes allow the second transistor to operate in a soft switching mode, which increases the efficiency of the power supply by reducing the power loss due to switching transients.

What is claimed is:

1. A power supply (10), comprising:
   a first transistor (20) (119) coupled to a first node (34) for switching a first coil current ($I_{19}$) in response to a first control signal ($V_{C1}$);
   a second transistor (30) having a body diode (32) coupled to the first node for discharging the first coil current to a second node to produce a corrected signal ($V_{PFC}$) of the power supply at the second node; and
   a third transistor (40) having a conduction channel (41) coupled for routing a second coil current ($I_{61}$) through the second transistor to a third node in response to a third control signal.

2. The power supply of claim 1, wherein the first transistor has a first conduction electrode (119) coupled to the first node (34) for switching the first coil current with the first control signal.

3. The power supply of claim 1, wherein the second transistor has a conduction channel (31) coupled to the first node for developing the corrected signal at the second node (52) with a second control signal ($V_{C3}$).

4. The power supply of claim 1, wherein the second coil current is discharged through a body diode (22) of the first transistor when the third control signal terminates.

5. The power supply of claim 4, wherein the conduction channel of the third transistor is activated a first time interval (TD1) before the first control signal terminates.

6. The power supply of claim 5, wherein the conduction channel of the second transistor is activated a second time interval (TD2) after the first control signal terminates.

7. A method of regulating, comprising the steps of:
   switching a first coil current ($I_{19}$) through a first node (34) and a first transistor (20) with a first control signal ($V_{C1}$);
   discharging the first coil current through a body diode (32) of a second transistor (30) to a second node to adjust an output voltage; and
   enabling a conduction path (31) of the second transistor to route a second coil current ($I_{61}$) through a third transistor ($V_{REG}$).

8. The method of claim 7, wherein the step of discharging includes the step of terminating the first control signal to turn off the first transistor.

9. The method of claim 8, wherein the step of discharging further includes the step of charging a capacitance ($C_{56}$) through the body diode of the second transistor to develop a corrected voltage ($V_{PFC}$).

10. The method of claim 7, wherein the step of routing includes the step of enabling the conduction path of the second transistor with a second control signal ($V_{C3}$).

11. The method of claim 10, wherein the step of routing further includes the step of discharging the capacitance through a third transistor (40).

12. The method of claim 11, wherein the step of discharging the capacitance includes the step of enabling a conduction path (41) of the third transistor a first time interval (TD1) before the step of terminating the first control signal.

13. The method of claim 12, wherein the step of discharging the capacitance further includes the step of enabling the conduction path of the second transistor a second time interval (TD2) after the step of terminating the first control signal.

14. The method of claim 7, further comprising the step of discharging the second coil current through a body diode (22) of the first transistor.

15. A power supply (10), comprising:
   a first transistor (20) having a conduction path (21) coupled to a first node (34) for switching a first coil current ($I_{19}$) with a first control signal ($V_{C1}$); and
   a second transistor (30) having a body diode (32) coupled to the first node for discharging the first coil current to a second node, and a conduction path (31) coupled for routing a second coil current ($I_{61}$) from the second node to a third node (52) in response to a second control signal ($V_{C3}$) ;
   a time shifting circuit (73, 93) for providing the second control signal a first time interval (TD2) after the first control signal terminates; and
   a third transistor (40) having a conduction path (41) coupled to the third node for receiving the second coil current from the second transistor in response to a third control signal.

16. The power supply of claim 15, wherein the time shifting circuit provides the third control signal a second time interval (TD1) before the first control signal terminates.

17. The power supply of claim 16, further comprising an oscillator (93) having a first output (82) for generating a first signal transition to terminate the first control signal.

18. The power supply of claim 17, wherein the oscillator has a second output (81) for generating a ramp signal ($V_{RAMP}$), and the time shifting circuit further includes a comparator (73) having a first input for receiving the ramp signal, a second input for receiving a reference signal ($V_{REF4}$), and an output (77) for generating a second signal transition ($V_{T2}$) to initiate the second control signal a time interval (TD2) after the first control signal terminates.

* * * * *